Jan. 24, 1928.

J. J. SCHNEIDER 1,657,281

ROLLER LUBRICATING DEVICE FOR AXLES AND THE LIKE

Filed April 15, 1926    5 Sheets-Sheet 1

Inventor
John Josef Schneider

By

Attorney

Jan. 24, 1928. 1,657,281
J. J. SCHNEIDER
ROLLER LUBRICATING DEVICE FOR AXLES AND THE LIKE
Filed April 15, 1926 5 Sheets-Sheet 2
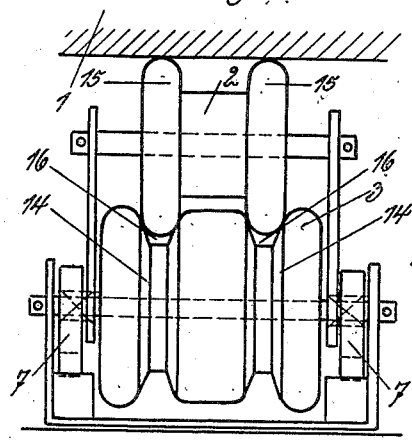
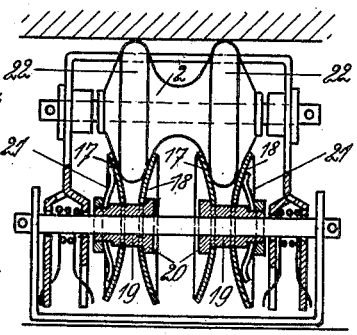
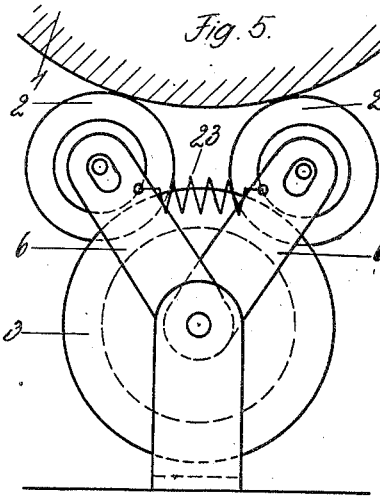
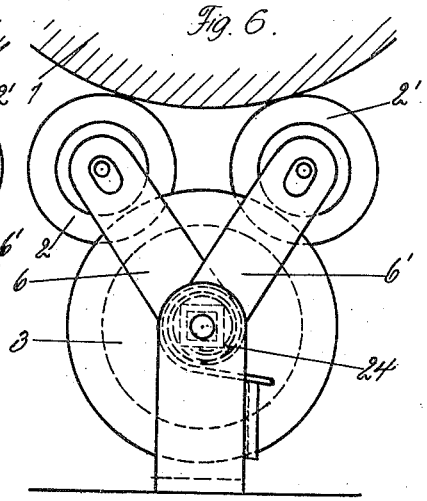
Inventor
John J. Schneider
Atty.

Jan. 24, 1928.　　　　　J. J. SCHNEIDER　　　　　1,657,281
ROLLER LUBRICATING DEVICE FOR AXLES AND THE LIKE
Filed April 15, 1926　　　5 Sheets-Sheet 3

Inventor
John J. Schneider,
By Henry Orth Jr.
Atty.

Jan. 24, 1928.  
J. J. SCHNEIDER  
1,657,281  
ROLLER LUBRICATING DEVICE FOR AXLES AND THE LIKE  
Filed April 15, 1926  
5 Sheets-Sheet 4
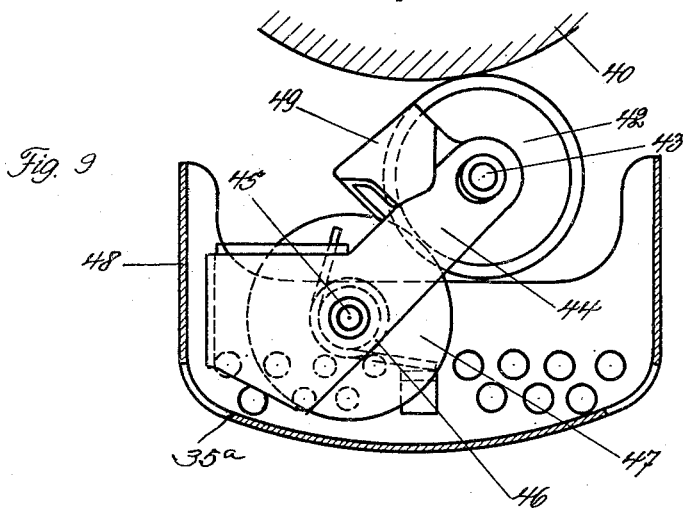
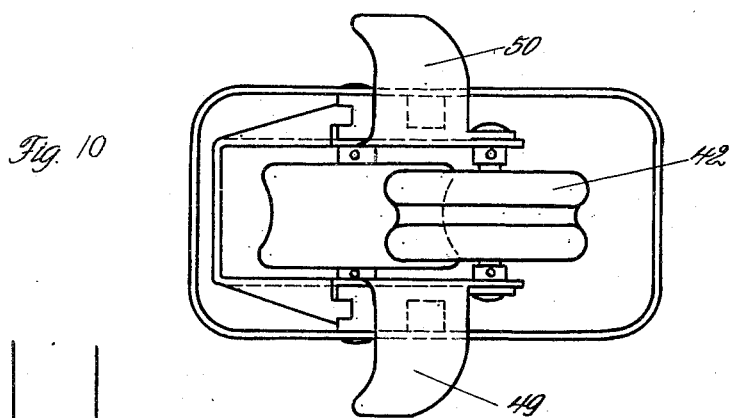
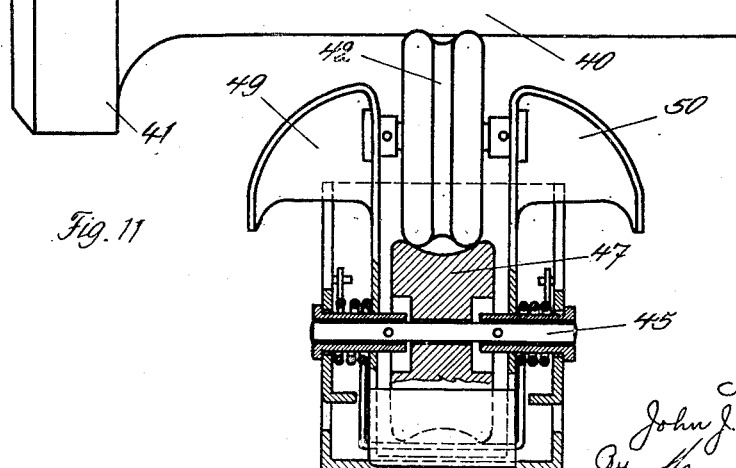
Inventor,  
John J. Schneider, Jan. 24, 1928.
J. J. SCHNEIDER
1,657,281
ROLLER LUBRICATING DEVICE FOR AXLES AND THE LIKE
Filed April 15, 1926  5 Sheets-Sheet 5
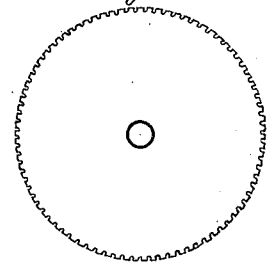
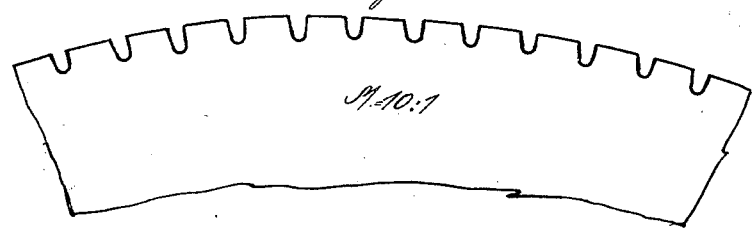
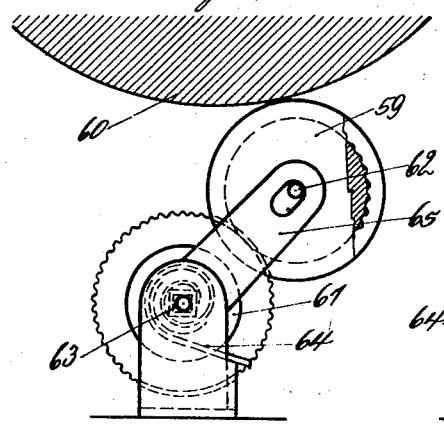
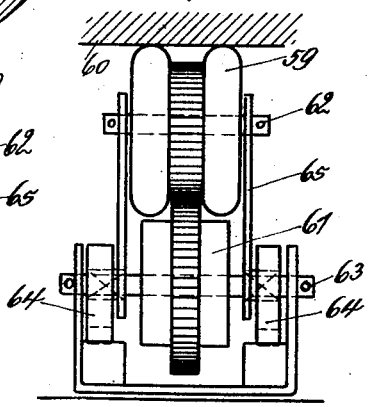

Patented Jan. 24, 1928.

1,657,281

UNITED STATES PATENT OFFICE.

JOHN JOSEF SCHNEIDER, OF FRANKFORT-ON-THE-MAIN, GERMANY, ASSIGNOR TO THE FIRM: DR. ING. & C. A. SCHNEIDER, OF FRANKFORT-ON-THE-MAIN, GERMANY.

ROLLER-LUBRICATING DEVICE FOR AXLES AND THE LIKE.

Application filed April 15, 1926, Serial No. 102,272, and in Germany May 14, 1925.

This invention relates to roller lubricating devices for axle-pins, shaft journals and the like, suitable more particularly for railway and other vehicles, of the type having one or more lubricating rollers or sets of rollers arranged in contact with the pin or journal to be lubricated.

In constructions in which the lubricating roller is secured in a pivotal arm, considerable axial pressure would, inasmuch as the said guide represents substantially an inclined plane, be exercised upon the roller by depression of the upper roller along such plane, which pressure under certain circumstances may altogether prevent the roller from descending, while in any case a heavy bending stress would be exercised upon the arm and its bearing support.

According to the invention this guide is so constructed, that axial forces are reduced to the lowest possible limit, while on the other hand the power effecting the depression of the roller is as high as possible. This is obtained by constructing the guides in the form of helical surfaces. In laying the guides against the front head of the axle-pin and sliding the guide along it, a rotary movement is imparted to the roller and the lubricating roller connected therewith, which has the effect of swinging the arm and the roller so that it passes the axle-pin head without fouling. If a surface is arranged in front as well as at the rear of the lubricating roller, the roller is prevented from striking the said head both in introducing and withdrawing the lubricating device.

Experience has shown, that in mechanical lubricating devices which are arranged below the axle-pin and driven thereby, it is necessary to ensure the driving of the lubricating roller under any circumstances, so that it performs the lubrication with reliability.

The subject of the present invention has proved to be particularly suitable for the attainment of the said object. It consists in giving the running surfaces of the lubricating roller a particular profile, which, according to experiments, considerably increase the circumferential driving force.

It has furthermore been established that the increase in the circumferential force ensuring the rotation of the lubricating roller is particularly high, if the pitch—assuming equal diameter of the lubricating roller—is reduced so that the number of teeth and spaces between them is increased.

In order to ensure the transfer rollers being driven under any circumstances by the lubricating rollers proper, the said rollers are, according to this invention, constructed as toothed wheels.

The invention further contemplates the lubricating and transfer rollers being not only made of metal but of fibrous materials held together by resinous substances, such as plates, which have, for example, been produced from sheets of paper or the like soaked in artificial resin, composed of polymerized phenols, and pressed in layers under heat. It has also been found that masses of a horn-like nature may be employed. Such masses are for instance, horn itself, vulcanized rubber, artificial horn produced from casein or casein substitutes, in short, any mass capable of replacing horn but not soluble in oil. Amongst vulcanized rubber compounds a rubber mass filled with graphite and saturated with sulphur is suitable.

It is sufficient if the contacting surfaces alone be made from such masses. They may thus be composed partly of metal while the contacting surfaces are made of or coated with the said masses.

The accompanying drawings illustrate various constructional forms of devices embodying the invention.

Referring to the drawings in which like parts are similarly designated—

Figs. 3 and 4 are front elevations showing different forms of rollers.

Figs. 5 and 6 are side elevations showing two oiling rollers contacting with a single transfer roller.

Figs. 9, 10 and 11 are side views partly in section, a plan and a vertical section of another form of lubricator.

Figs. 14 and 15 are a side view and a front view of a finely corrugated roller.

Fig. 16 is a view, ten times enlarged, showing the corrugations.

Figs. 17 and 18 show another roller construction.

Figure 1:
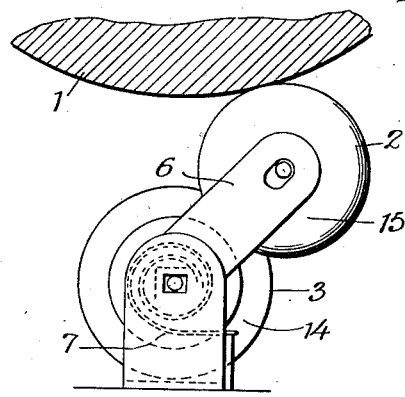
Figures 1 and 2 are side and front elevations showing one form of roller construction.
Figure 2:
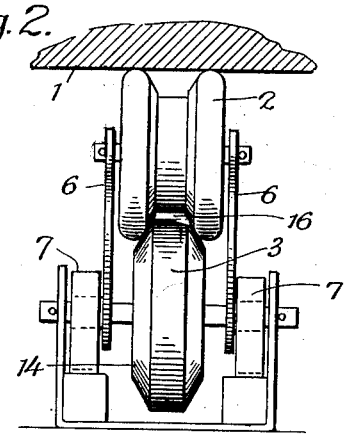

Figures 1 and 2 represent a side and front elevation of a construction which in its general arrangement has the transfer roller 3 provided with two wedge shaped edges 14 which engage correspondingly shaped edges of the V-shaped groove 15 of the lubricating roller 2.

When, under the influence of spring 7, the roller 2 is pressed between the axle 1 and the transfer roller 3, the bevelled edges 14 engage the V groove 15 in wedge-like manner and ensure the driving of the roller 3. A free space may thus be left between the rollers as shown at 16, whereby the transfer of oil is facilitated.

In the construction shown in Fig. 3 the transfer roller 3 is provided with two V shaped grooves, which engage correspondingly beaded rims 15 of the lubricating roller. A free space 16, is also in this arrangement, left in the grooves between the two rollers to facilitate the transfer of the lubricating oil.

The construction represented by Fig. 4, shows the oil transfer roller 3 as composed of two pairs of discs 17 and 18 oppositely dished, each pair being mounted on a bushing 19, which at one end is provided with a flange 20. At the other end of the bush is fitted a flat spring 21 having cross-arms or a volute spring which bears against the disc 17. The spring is held in place by a nut on the reduced end of the bushing or otherwise. By this means the two discs are pressed against the rims 22 of the lubricating roller, whereby pressure is effected independently without dependence on the rotation of the roller on its shaft. The discs engage the rims 22 in a lateral direction and thereby exercise a pressure which ensures reliable transmission of movement.

Instead of providing the transfer roller with grooves or compose it of discs, the lubricating roller may be formed in this manner, while the transfer roller is a full roller.

The distance between the discs constituting the roller is preferably kept as small as possible so that they carry oil along by adhesion.

Fig. 5 illustrates another modification of construction. In this instance two lubricating rollers 2 and 2' are provided in contact with the transfer roller 3. The rollers 2 and 2' are mounted in a lever 6 and 6' respectively and the two latter are drawn together by a spring 23, whereby the two rollers 2 and 2' are tightly pressed against the roller 3, inasmuch as the roller 3 is again constructed as a V shaped, wedge-like roller.

Fig. 6 shows a construction similar to that of Fig. 9, in which the spring 23 is replaced by one or two spiral springs 24 acting upon the levers 6 and 6'. The rollers also in this example have wedge-like engaging surfaces.

Figure 7:
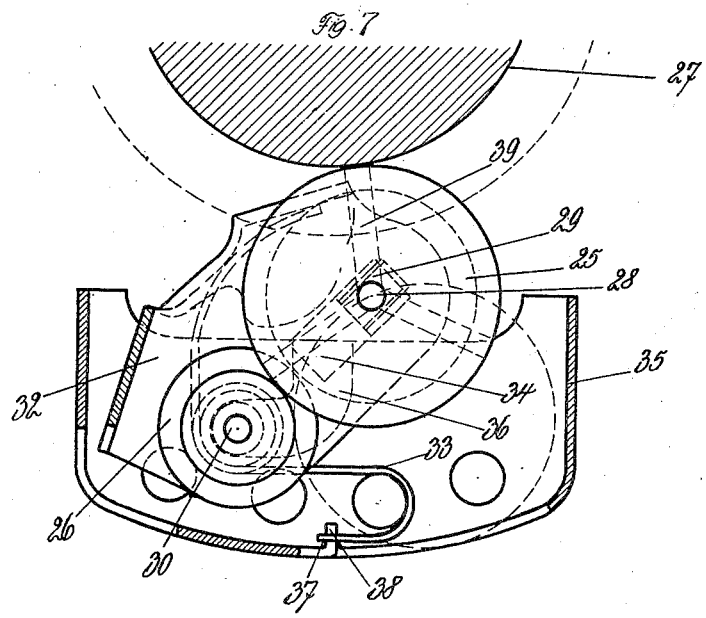
Figs. 7 and 8 are side views partly in section and a vertical transverse section of a complete device held assembled by a single spring.
Figure 8:
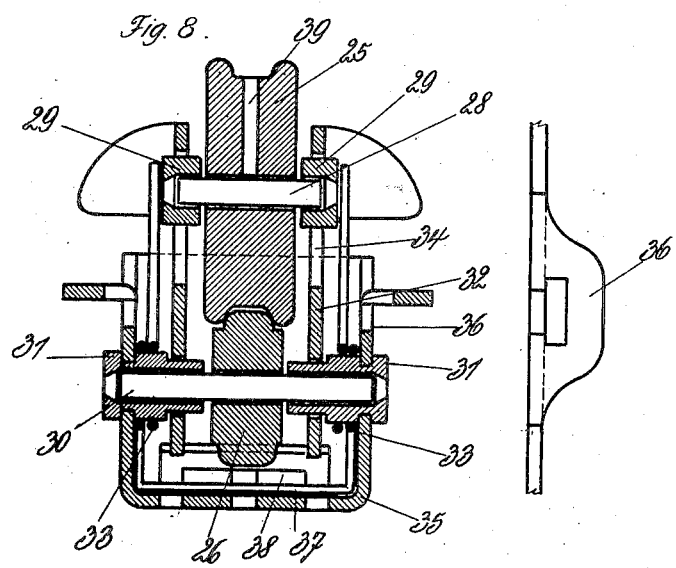

Two more examples of construction are shown in Figs. 7 and 8. The upper rollers 25 of the lubricating device are here provided with radial bores 39, and arranged to swing about the lower roller 26; 27 is the axle to be lubricated. The shaft 28 of the upper roller is journalled in suitable bores of a pair of guide blocks 29. The bores in the said guide blocks are in the form of sockets to prevent axial movements in both directions of the shaft 28. The shaft 30 of the lower roller is similarly journalled in bores of a pair of guide blocks 31. The bores also of these guide blocks are fashioned to form abutments preventing axial displacements of the shaft 30.

In profile the cylindrical guide blocks 31 are shaped to constitute fulcrums for the forked arm 32, upon which the said forked arm is adapted to rock under the influence of the spring 33.

Assembly of this device is effected in the following manner: The two guide blocks 29, together with the roller 25 and the shaft 28, are inserted into the wide part of the upper slot of the fork 32 whereupon the roller together with the guide blocks and its shaft is slid upwardly into the narrower part of the said slot. Thereafter the lower roller 26 with the shaft 30, the two guide blocks 31 and the spring 33 are fitted into perforations provided therefor in the fork 32.

Only when the assembly of the two rollers, with their shafts and guide blocks in the fork 32 has been completed in the manner set forth, is the whole unit placed from above into the frame 35. For this purpose the frame 35 has formed in it right angled bayonet slots 36 which in their horizontal portions are widened out to enable the introduction of the exterior heads of the guide blocks 31. To accomplish this, the guide blocks 31 of the lower roller assembled in the form in the manner hereinbefore described, are slid from above into the slot 36 and shifted to the left in the horizontal part thereof until the guide blocks 31 abut against the extreme end of the slots.

Finally the horizontal part 37 of the spring 33, is anchored upon the bent up lug 38 of the frame 35. The assemblage thus being completed the shafts of the rollers are held in their correct positions by the sole agency of the spring 33.

The frame 35 is provided with an abutment or stop against the upward movement of the forked arm, and is conveniently formed as shown in Fig. 9, by the lower edge 35ª of a cut-away portion.

It is obvious that the fundamental idea of the invention is applicable to lubricating devices of different constructions as for instance with one roller, or rollers with lubricating rings or rollers with lubricating chains.

Figs. 9, 10 and 11 show yet another constructional example of such a device.

The axle to be lubricated is indicated by 40, and its flange by 41. In contact with the axle is the lubricating roller 42 which is journalled at 43 in the arm 44, while in its turn the said arm is pivotally mounted on the shaft 45 and is under the influence of a spring 46. The lubricating roller 42 receives the lubricant through the agency of the transfer roller 47, the shaft 45 of which is journalled in the frame 48.

The arm 44 is provided with two guide wings, 49 and 50, whose curvature corresponds to a helicoidal surface, which, in the introduction and withdrawal of the lubricating device contact with the head 41 of the axle-pin 40. This contacting and sliding along of the helicoidal surfaces upon the head 41, causes the arm 44 together with the lubricating roller 42 to be depressed so that the whole apparatus can without difficulty be passed below the axle pin head. The helicoidal configuration of the surfaces 49 and 50 produces substantially a rotary movement, which causes the arm 44 to rock about its shaft 45. These guides also receive drip from the journal and divert it into the journal box outside of the frame where any contained metal will have a chance to deposit before it again enters the frame.

It is obvious that this guide may be employed if a chain or any other lubricant conveyor are substituted for the oil transfer roller 47.

Figure 12:
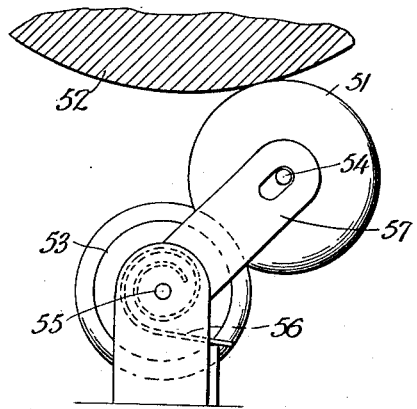
Figs. 12 and 13 illustrate roller construction.
Figure 13:
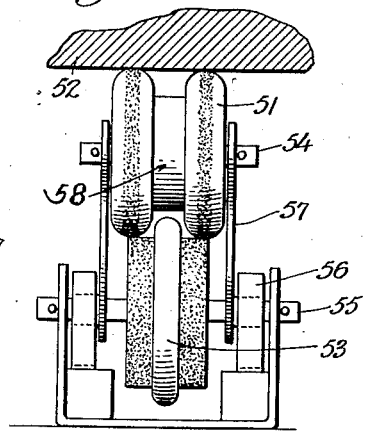

Further variations are shown by way of example in Figs. 12 and 13.

51 indicates the lubricating roller, 52 the axle. The lubricating roller 51 is rotatably mounted on the shaft 54. The two clock-springs 56 press the roller 51—which is mounted in known manner in the forks 57 to swing about the shaft 55—against the polished axle pin 52.

Figs. 12 and 13, show mounted on the shaft 55 an additional co-operating roller 53. This roller 53 is provided with projections, adapted to engage the grooves 58 of the roller 51. By these means the grooves are maintained open.

Figs. 14 and 15 show a lubricating roller of this construction, the running surface of which is subdivided while the pitch of the grooves is very small, so that the number of teeth and spaces is large. Fig. 16 shows the same lubricating roller on a scale enlarged at the rate of 10 to 1, so as to show the relative proportions of the thickness of the teeth and the width and depth of the spaces between them.

Figs. 17 and 18 show an example in which the rollers are constructed in the form of spur wheels. 59 is the lubricating roller, 60 the axle, and 61 the transfer roller. The roller 59 is rotatably mounted on the shaft 62, the roller 61 on the shaft 63. By means of the two clock springs 64, the roller 59— which is mounted in known manner in the levers 65 to swing about the shaft 63—is pressed between the axle-pin 60 and the roller 61. To ensure reliable transmission of rotary motion from the roller 59 upon the roller 61, both the said rollers are formed as spur-wheels.

As frequently it has been found that under the influence of shocks the contacting lubricating roller is thrown suddenly away from the axle-pin, only to be thrust back against it with force, so that the axle pin is subjected to hammer-like strokes and damaged, it is advisable to provide for equalization of weights in such a manner, that the lever and roller carried thereby are counter-balanced in part or to the greatest part by means of a counterweight arranged on the other end of the said lever. In the event of shocks it will then, in consequence of the counter-balance, not be possible for the roller and its associated members to receive accelerated mass impulse, and the lubricating roller, upon being separated from the axle-pin, will simply be drawn back into contact therewith under the influence of the spring as if it was possessed of no weight at all. Such an arrangement may be made whether one or more lubricating rollers are used.

I claim:

1. In a lubricating device for car axles, a roller maintained in contact with a body of oil and a second roller in frictional engagement with the first roller for transferring lubricant from the latter to the car axle, one of the rollers being provided with a groove having substantially inclined sides and the other roller with a rib having side faces complementary to said sides and engaging the inclined walls of the groove.

2. A lubricating device for car axles, comprising a frame having aligned bayonet slots in its sides, a forked arm having slots in its fork ends and bushing holes, an oiling roller, a loose shaft therefor, guide blocks having sockets for the ends of said shaft and arranged to be slipped into said slots, an oil transfer roller in contact with the oiling roller, a shaft therefor, bushings, sockets for the ends of said latter shaft, said bushings entering the bushing holes of said arm, a spring having a coil surrounding each bushing, said bushings, frame and rollers arranged to be mounted in a casing with the bushings entering the bayonet slots, and means for fastening said spring in the casing, whereby said spring is the holding means to maintain the parts assembled in their operative position.

3. A lubricating device for car axles, comprising a frame having an opening in its bottom, an upturned lug thereat, and bayonet slots in its sides, a forked arm, slots in its fork ends and narrower at their upper ends, an oiling roller, a loose shaft therefor, guide blocks having sockets for the ends of said shaft and retained in the narrower portions of the slots in said arm, an oil transfer roller contacting with the oiling roller, a shaft therefor, peripherally grooved bushing on which said arm is pivoted having sockets for the ends of the latter shaft, a spring having coils around said bushings engaging the bayonet slots, and said spring engaging said arm and held by said lug.

4. In a lubricating device, a frame, an oil transfer roller, means for journalling the roller in the frame, a forked arm pivoted in the frame, an oiling roller carried by the arm and a spring to hold the parts operatively assembled.

5. A lubricator for car axles having an oil transfer roller, an oiling roller contacting therewith and mounted to swing about the axis of the latter roller, in combination with guides arranged at both ends of the oiling roller for guidance into a journal box and to catch drip from the journal and divert it from the frame.

6. A lubricator for car axles having an oil transfer roller, a forked arm mounted to swing about the axis of said roller, and an oiling roller mounted in said arm and contacting with said transfer roller, in combination with helicoidal guides on said arm at both ends of the oiling roller and movable with the arm for guidance into a journal box and to catch drip from the journal and divert it from the frame.

7. A lubricating device for car axles comprising a frame, a shaft having a bayonet connection with the frame, a fork and an oil-transfer roller loose on said shaft, oiling rollers mounted in key-hole slots in said fork and held in operative position by said transfer roller, an abutment on the frame to limit the movement of the fork, and a single spring resiliently holding the fork in operative position in the frame.

8. A lubricating device for car axles, comprising a perforated hollow frame having key-hole slots in its sides and a lug and a fork, abutment bushings slidable into said slots, a shaft in said bushings, an oil transfer roller mounted on the shaft between the bushings, a fork mounted on the bushings, an oiling roller mounted in the fork in contact with the transfer roller, and a single spring held by said lug and engaging the fork to urge it upward.

In testimony that I claim the foregoing as my invention, I have signed my name this 29th day of March, 1926.

JOHN JOSEF SCHNEIDER.